3,134,757
N,N'-MERCURIBISACRYLAMIDE COMPOUNDS
Robert Angelo Micheli, Oakland, Calif., assignor to The Dow Chemical Company, Midland, Mich., a corporation of Delaware
No Drawing. Filed Sept. 24, 1958, Ser. No. 762,928
8 Claims. (Cl. 260—80.3)

The present invention relates to N,N'-mercuribisacrylamide compounds and to derivatives thereof, particularly polymeric and resinous products, and to a method for the preparation of certain of said products.

An object of this invention is to provide, as a new composition of matter, N,N'-mercuribisacrylamide compounds having the characterizing group

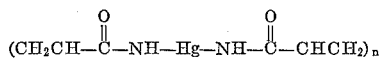

wherein $n$ is an integer of at least 1. A particular object is to provide monomeric N,N'-mercuribisacrylamide having the structure

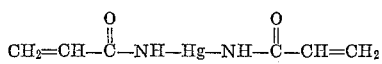

A further object is to provide polymeric products derived from N,N'-mercuribisacrylamide wherein said polymeric products have as essential constituents of their polymeric structure the group

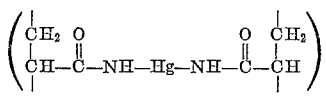

A still further object is to provide methods for the preparation of the polymeric products.

The monomeric N,N'-mercuribisacrylamide of the present invention is a white crystalline solid, soluble in water and acetone, somewhat soluble in alcohol and substantially insoluble in xylene and kerosene.

N,N'-mercuribisacrylamide may be prepared by the reaction of acrylamide with mercuric oxide. Water is a by-product in this reaction. Good results are obtained when approximately equimolar proportions of the reactants or an excess of the acrylamide reactant are employed. The reaction is preferably carried out in an inert solvent in the temperature range of from about 65° to 85° C. and most conveniently at the boiling point of the solvent for a period sufficient to allow completion of the reaction. Suitable solvents include ethyl alcohol, isopropyl alcohol and methyl alcohol.

In carrying out the reaction, mercuric oxide is added to a solution of acrylamide in a suitable solvent and the reaction mixture heated at a temperature of from about 65° to 85° C. for a period of from 1 to 2 hours. A reaction takes place during the heating with the formation of N,N'-mercuribisacrylamide, water of reaction and frequently a by-product polymeric material. After completion of the heating any by-product polymer, if formed, and unreacted mercuric oxide are removed by filtration and the desired product recovered from the remaining reaction mixture. The latter is carried out by cooling and/or concentrating the reaction mixture by partial vaporization of the solvent whereupon the product precipitates as a white crystalline solid. The product may be purified by conventional procedures.

Monomeric N,N'-mercuribisacrylamide may be polymerized alone, or copolymerized with other ethylenically unsaturated monomeric compounds, generally characterized by the presence of at least one $CH_2=C<$ grouping, including such monomers as acrylamide, methacrylamide, acrylic and methacrylic esters, acrylonitrile, vinyl halides, vinyl acetates and other vinyl esters, vinyl lactams, vinyl morpholinone, vinyl oxazolidinone, vinyl succinimide, vinyl sulfonic acids and esters, vinyl pyrodine, ethylene, propylene, isobutylene, butadiene, chloroprene, and other olefins, styrene, vinyl toluene and similar alkenyl aromatic monomers, to form polymeric compositions of polymerized N,N' - mercuribisacrylamide compounds. The polymeric compositions are preferably products containing a minor proportion of the N,N'-mercuribisacrylamide wherein it acts as a cross-linking agent. In polymeric compositions comprising copolymers of N,N'-mercuribisacrylamide, it is desirable for the latter to constitute at least 2 percent by weight of the mixture of copolymerizable materials. Preferably, the N,N'-mercuribisacrylamide monomer of the present invention constitutes from about 5 to 20 percent by weight of the polymer although it may constitute higher proportions of the polymer.

The polymerization may be carried out in mass, i.e., in the substantial absence of inert liquid medium, in solution, i.e., in a solvent for the monomers or in emulsion or suspension, i.e., in a liquid medium which is not a solvent for the monomers. When solution, emulsion or suspension polymerization is employed, the reaction may be carried out at practically any suitable concentration of the monomers. It is ordinarily desirable for the polymerization to be carried out at a temperature of between about 0 and 100° C., although this may vary with the particular catalysts used and the type of reaction being conducted. Suitable catalysts or initiators include peroxygen catalysts, such as potassium persulfate, hydrogen peroxide, benzoyl peroxide, etc., azo catalysts such as alpha,alpha'-azobisisobutyronitrile, and irradiation under the influence of ultraviolet light or of high energy fields, such as X-ray and gamma radiations as well as radiations from radioactive materials and high energy electron beams generated from linear accelerators, resonant transformers and the like. The polymerization is carried out in the pH of about 5 or higher. The monomer will also undergo thermal polymerization by simply heating at a temperature of about 100° C. If desired, thermal mass polymerization may also be carried out under an inert atmosphere, e.g. nitrogen. It is preferable, however, for the monomer to be polymerized in aqueous or other inert liquid medium in the presence of a free radical generating type of catalyst at a temperature in the range of from about 20° to 100° C.

In a preferred method for preparing the polymeric products, N,N'-mercuribisacrylamide compound or a mixture of the N,N'-mercuribisacrylamide and an ethylenically unsaturated monomer, in the desired proportions is mixed with an inert solvent for the monomers, preferably water, to form a solution containing the monomeric materials suitably in concentrations between 5 and 60 percent by weight. A polymerization catalyst is added or the mixture is subjected to the action of a polymerization initiator, and maintained at polymerization temperatures between 0° and 100° C. to effect the polymerization of the monomers. The polymer can be recovered in usual ways, e.g. by evaporating the solvent suitably under reduced pressure or by precipitating the polymer in a non-solvent such as methyl alcohol or ethyl alcohol, after which it is separated, washed and dried.

Polymeric products are generally non-hygroscopic, white or light colored, free-flowing powders having a non-crystalline nature. The polymeric products are hard and brittle, insoluble in water and in organic solvents such as lower aliphatic alcohols, acetone, dimethylformamide, glycerol and the like, due to their cross-linked properties. The polymeric products may be prepared as polymers having molecular weights in the range of 200,000 to 3,000,000 and higher.

The polymeric materials are stable in alkaline media but slowly react in acid media with the release of mercury. This property may be employed beneficially in systems requiring mercury catalyst which are preferably contained in an organic carrier. The polymers are also useful as fungicides and particularly useful where controlled release of mercury is desirable, such as in seed treatment to protect seed against attach by microorganisms.

The N,N'-mercuribisacrylamide monomer is also useful as a fungicide and as a toxic constituent in other parasiticidal compositions. Thus, it is useful as an insecticide for the control of species such as the Mexican bean beetle, *Epilachna varivestis*, and southern armyworm, *Prodenia eridania*, larvae. Other uses include inhibition of nitrification in soil.

The following examples illustrate the invention but are not to be construed as limiting.

*Example 1.—N,N'-Mercuribisacrylamide*

60.0 grams (0.278 mole) of mercuric oxide was mixed with a solution of 48.0 grams (0.668 mole) of acrylamide in 400 milliliters of 95 percent ethyl alcohol. The mixture was heated at reflux temperature with stirring for a period of 90 minutes. Thereafter, 100 milliliters of alcohol was distilled therefrom and the remaining mixture filtered to remove polymeric by-product and unreacted mercuric oxide. The colorless filtrate was allowed to stand at room temperature for 12 hours to precipitate white, crystalline, N,N'-mercuribisacrylamide product. The latter was recovered by filtration, washed with cold methanol and dried in a vacuum oven at 100° C. for 0.5 hour to obtain a purified product in a yield of 14.77 grams or 22.7 percent of theoretical. The product had elemental analyses as follows:

|  | C | H | N | Hg |
|---|---|---|---|---|
| Calculated | 21.15 | 2.37 | 8.22 | 58.87 |
| Found | 21.70 | 2.39 | 8.27 | 58.83 |

Infrared and X-ray analyses confirmed the identification of the product as N,N'-mercuribisacrylamide.

*Example 2*

1.5 grams of N,N'-mercuribisacrylamide and 6.0 grams of acrylamide were dissolved in 17.5 milliliters of water. The pH of the mixture was adjusted to 5.0 and further charged with the following:

| | Parts per million by weight (based on total solution) |
|---|---|
| Sodium bromate | 300 |
| Potassium persulfate | 20 |
| Riboflavin | 30 |

Polymerization started immediately and proceeded rapidly to completion to produce a copolymer of acrylamide and N,N'-mercuribisacrylamide as a white solid which precipitated in the reaction mixture. The solid was hard and brittle.

3 grams of copolymer in 200 milliliters of water remained substantially undissolved even after agitation for 24 hours. Acidification to pH 2.5 followed by agitation for 48 hours produced a viscous solution.

In a manner similar to those set forth in the foregoing N,N'-mercuribisacrylamide is polymerized to obtain homopolymeric products or to obtain copolymers with other monomers such as styrene, acrylonitrile, vinyl butyrate, methyl methacrylate, methacrylonitrile, vinyl chloride, vinylidene chloride and the like.

Monomeric N,N'-mercuribisacrylamide is useful as a toxic constituent in parasiticide compositions. Thus, in a use as fungicide, the growth of fungal species, *Fusarium oxysporum lycopersici*, is completely inhibited on rose-bengalstreptomycin agar plates containing 10 parts per million by weight of N,N'-mercuribisacrylamide. In a use for the control of plant pests, complete controls of the causative organism of tomato early blight, *Alternaria solani*, is obtained by spraying infested tomato plants with an aqueous dispersion containing 0.50 percent by weight of N,N'-mercuribisacrylamide. Additionally, the monomeric compound is useful for promoting plant growth and inhibiting the conversion of reduced nitrogen in the soil to nitrate and nitrite nitrogen. In a representative operation of its use as nitrification inhibitor, an aqueous ammonium sulfate solution containing 5 parts per million by weight of N,N'-mercuribisacrylamide is dispersed throughout air-dried sandy loam soil, containing essentially no organic material and having been freed of nitrate and nitrite nitrogen by prior thorough leaching with water. The resulting treated soil is incubated at 25° C. for one week. At the end of this period the soil is analyzed colorimetically for nitrate and nitrite nitrogen and compared with a check soil similarly treated with an aqueous ammonium sulfate solution containing no N,N'-mercuribisacrylamide. It is found that in the soil treated with the composition containing N,N'-mercuribisacrylamide there is substantially complete inhibition of nitrification whereas there is no inhibition of nitrification in the check soil.

Polymeric N,N'-mercuribisacrylamide is also useful for the control of parasites. It is particularly useful in applications such as for the control of parasites living in soil such as soil dwelling fungi. For such use the polymer is intimately mixed with the soil in any manner for applying solid material such as discing or dragging, or applied thereon in a liquid carrier and thereafter mechanically mixed with the soil.

I claim:

1. Monomeric N,N'-mercuribisacrylamide having the structure

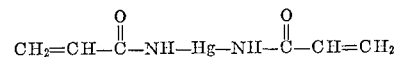

2. A composition of matter as claimed in claim 6, wherein the ethylenically unsaturated monomeric compound is acrylamide.

3. A method of preparing a copolymeric composition which comprises polymerizing a copolymerizable mixture comprising N,N'-mercuribisacrylamide and a monomer copolymerizable therewith and containing at least one $CH_2=C<$ grouping at a temperature of from about 0° C. to about 100° C. at a pH above about 5, wherein the N,N'-mercuribisacrylamide component constitutes from about 2 to about 20 percent by weight of the copolymerizable mixture.

4. A method of preparing a copolymeric composition which comprises polymerizing a copolymerizable mixture comprising N,N'-mercuribisacrylamide and acrylamide at a temperature of from about 0° C. to about 100° C. at a pH above about 5, wherein the N,N'-mercuribisacrylamide component constitutes from about 2 to about 20 percent by weight of the copolymerizable mixture.

5. A composition of matter comprising a resinous homopolymer of N,N'-mercuribisacrylamide.

6. A composition of matter comprising a resinous polymer of (1) N,N'-mercuribisacrylamide and (2) an ethylenically unsaturated monomeric compound copolymerizable therewith and characterized by the presence of at least one $CH_2=C$ grouping and wherein the N,N'-mercuribisacrylamide component of said polymer consists of from 2 to 100 percent by weight.

7. A method of preparing a polymeric composition which comprises polymerizing N,N'-mercuribisacrylamide at a temperature of from about 0° to about 100° C. at a pH above about 5, wherein the N,N'-mercuribisacrylamide component constitutes from about 2 to about 100 percent by weight of the polymerizable mixture, and wherein the remainder constitutes correspondingly from about 98 to 0 percent of an ethylenically unsaturated monomer copolymerizable with N,N'-mercuribisacrylamide and characterized by the presence of at least one $CH_2=C$ grouping.

8. N-mercuripolyacrylamide.

References Cited in the file of this patent

UNITED STATES PATENTS

| | | |
|---|---|---|
| 2,045,080 | Hagedorn | June 23, 1936 |
| 2,132,671 | Bauer | Oct. 11, 1938 |
| 2,698,264 | Niles | Dec. 28 1954 |
| 2,726,230 | Carlson | Dec. 6, 1955 |
| 2,849,426 | Miller | Aug. 26, 1958 |